US012244088B2

(12) United States Patent
Yamanashi et al.

(10) Patent No.: US 12,244,088 B2
(45) Date of Patent: Mar. 4, 2025

(54) CONNECTOR WITH CONNECTION TERMINALS CORRESPONDING TO STABLE SET IN A CONNECTOR HOUSING TO ACHIEVE STABLE MOUNTING STRUCTURE

(71) Applicant: Yazaki Corporation, Tokyo (JP)

(72) Inventors: Daisuke Yamanashi, Shizuoka (JP); Takashi Sone, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 398 days.

(21) Appl. No.: 17/966,747

(22) Filed: Oct. 14, 2022

(65) Prior Publication Data

US 2023/0117463 A1 Apr. 20, 2023

(30) Foreign Application Priority Data

Oct. 20, 2021 (JP) ................................ 2021-171273

(51) Int. Cl.

*H01R 13/42* (2006.01)
*H01R 13/502* (2006.01)
*H01R 13/631* (2006.01)
*H01R 13/639* (2006.01)

(52) U.S. Cl.

CPC ........... *H01R 13/42* (2013.01); *H01R 13/502* (2013.01); *H01R 13/6315* (2013.01); *H01R 13/639* (2013.01)

(58) Field of Classification Search

CPC .. H01R 13/42; H01R 13/502; H01R 13/6315; H01R 13/639; H01R 13/187; H01R 13/426; H01R 2105/00; H01R 2201/26

See application file for complete search history.

(56) References Cited

U.S. PATENT DOCUMENTS 8,257,107 B2 * 9/2012 Tsuruta .............. H01R 13/6581 439/559
2013/0153292 A1 * 6/2013 Adachi .................. H01B 7/009 174/70 R
2015/0038022 A1 * 2/2015 Kataoka ............... H01R 13/426 439/752
2018/0175534 A1 * 6/2018 Sugiyama .......... H01R 13/2464
(Continued)

FOREIGN PATENT DOCUMENTS

JP 2019-133759 A 8/2019
JP 2021-72222 A 5/2021

*Primary Examiner* — Peter G Leigh
*Assistant Examiner* — Nader J Alhawamdeh
(74) *Attorney, Agent, or Firm* — KENEALY VAIDYA LLP

(57) ABSTRACT

A connector includes a terminal fitting that includes a terminal connection section, and a housing that includes a terminal accommodating section in which the terminal fitting is inserted into a terminal accommodating chamber in the terminal accommodating section in a terminal insertion direction and accommodated at an accommodation completion position, wherein the terminal connection section is a tubular section bent in a tubular shape with end surfaces of two end portions facing each other, and includes a recess that is recessed from a distal end of the terminal connection section on a terminal insertion direction side, in a terminal removal direction opposite to the terminal insertion direction, the terminal insertion direction being a tube axis direction.

4 Claims, 12 Drawing Sheets

(56) References Cited

U.S. PATENT DOCUMENTS

| | | | | |
|---|---|---|---|---|
| 2018/0358740 | A1* | 12/2018 | Yamanashi | H01R 13/512 |
| 2018/0358748 | A1* | 12/2018 | Yamanashi | H01R 24/62 |
| 2019/0237892 | A1 | 8/2019 | Hashimoto et al. | |
| 2019/0363479 | A1* | 11/2019 | Yamanashi | H01R 13/5205 |
| 2020/0313344 | A1* | 10/2020 | Araki | H05K 7/20127 |
| 2020/0335909 | A1* | 10/2020 | Kamimura | H01R 13/426 |
| 2021/0044049 | A1* | 2/2021 | Tsukamoto | H01R 13/24 |
| 2022/0158380 | A1* | 5/2022 | Masuda | H01R 13/506 |
| 2022/0158384 | A1* | 5/2022 | Masuda | H01R 13/506 |
| 2023/0117463 | A1* | 4/2023 | Yamanashi | H01R 13/639<br>439/752 |
| 2023/0118800 | A1* | 4/2023 | Nakano | H01R 13/426<br>439/352 |
| 2023/0119971 | A1* | 4/2023 | Nakano | H01R 13/629<br>439/271 |
| 2023/0122368 | A1* | 4/2023 | Yamanashi | H01R 13/6592<br>439/589 |
| 2024/0088613 | A1* | 3/2024 | Yamanashi | H01R 13/621 |

* cited by examiner

CONNECTOR WITH CONNECTION TERMINALS CORRESPONDING TO STABLE SET IN A CONNECTOR HOUSING TO ACHIEVE STABLE MOUNTING STRUCTURE

CROSS-REFERENCE TO RELATED APPLICATION(S)

The present application claims priority to and incorporates by reference the entire contents of Japanese Patent Application No. 2021-171273 filed in Japan on Oct. 20, 2021.

BACKGROUND OF THE INVENTION

1. Field of the Invention

The present invention relates to a connector.

2. Description of the Related Art

There is a connector in which a terminal fitting has a tubular terminal connection section, and the terminal fitting can be accommodated in a housing even when rotating around a tube axis thereof. In such a connector, generally, a quality in electrical connection between a terminal fitting and a mating terminal fitting cannot be obtained. For example, only in a case where the terminal fitting is accommodated in the housing in a correct insertion posture, the terminal fitting can be physically and electrically connected to the mating terminal fitting, and in a case where the terminal fitting is accommodated in the housing in an incorrect insertion posture in which the terminal fitting rotates from a normal position, the terminal fitting cannot be physically connected to the mating terminal fitting. Therefore, for example, in a connector according to the related art, a protrusion protruding outward is provided in the terminal fitting, and only the terminal fitting inserted in the correct insertion posture is accommodated in the housing, thereby suppressing erroneous insertion of the terminal fitting (Japanese Patent Application Laid-open No, 2019-133759). However, such a protrusion of the terminal fitting needs to secure an insertion track corresponding to the protrusion in the housing, which may cause an increase in size of the housing. Therefore, in a connector according to the related art, a notch provided in the terminal connection section of the terminal fitting and the protrusion provided in the housing are arranged in such a way as to be able to be fitted only when the terminal fitting is inserted in the correct insertion posture, so that only the terminal fitting inserted in the correct insertion posture is accommodated in the housing, thereby suppressing erroneous insertion of the terminal fitting (Japanese Patent Application Laid-open No. 2021-72222).

By the way, the notch of the terminal fitting may cause stress concentration depending on arrangement of the terminal connection section on a wall, which may cause a decrease in strength.

SUMMARY OF THE INVENTION

Therefore, an object of the present invention is to provide a connector capable of suppressing erroneous insertion of a terminal fitting and a decrease in strength.

To achieve the above object, a connector according to one aspect of the present invention includes a terminal fitting that includes a terminal connection section physically and electrically connected to a mating terminal fitting; and a housing that includes a terminal accommodating section in which the terminal fitting is inserted into a terminal accommodating chamber in the terminal accommodating section in a terminal insertion direction and accommodated at an accommodation completion position, wherein the terminal connection section is a tubular section bent in a tubular shape with end surfaces of two end portions facing each other, and includes a recess that is recessed from a distal end of the terminal connection section on a terminal insertion direction side, in a terminal removal direction opposite to the terminal insertion direction, the terminal insertion direction being a tube axis direction, the recess is formed by two cut portions obtained by cutting corner portions of the distal end of the terminal connection section on two end portion sides, and the terminal accommodating section includes a projection that is inserted into the recess of the terminal connection section at the accommodation completion position from a distal end side.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a connector according to the present invention will be described in detail with reference to the drawings. Note that the present invention is not limited by the embodiment.

EMBODIMENT

One embodiment of a connector according to the present invention will be described with reference to FIGS. 1 to 14.

Reference Sign 1 in FIGS. 1 to 8 denotes a connector according to the present embodiment. The connector 1 is attached to an end of an electric wire We, and is electrically connected to a device (not illustrated) on the other side of the electric wire We. Then, the connector 1 is electrically connected to a mating terminal fitting 510 (FIG. 2) of a mating device 500 to electrically connect the mating device 500 and the device on the other side of the electric wire We. The mating terminal fitting 510 is arranged in a mating fitting space 500*b* of a casing 500*a* of the mating device 500 and is electrically connected to the connector 1 fitted in the mating fitting space 500*b*. For example, here, the device on the other side of the electric wire We is an inverter of a vehicle, and the mating device 500 is a rotary machine of the vehicle.

Figure 3:
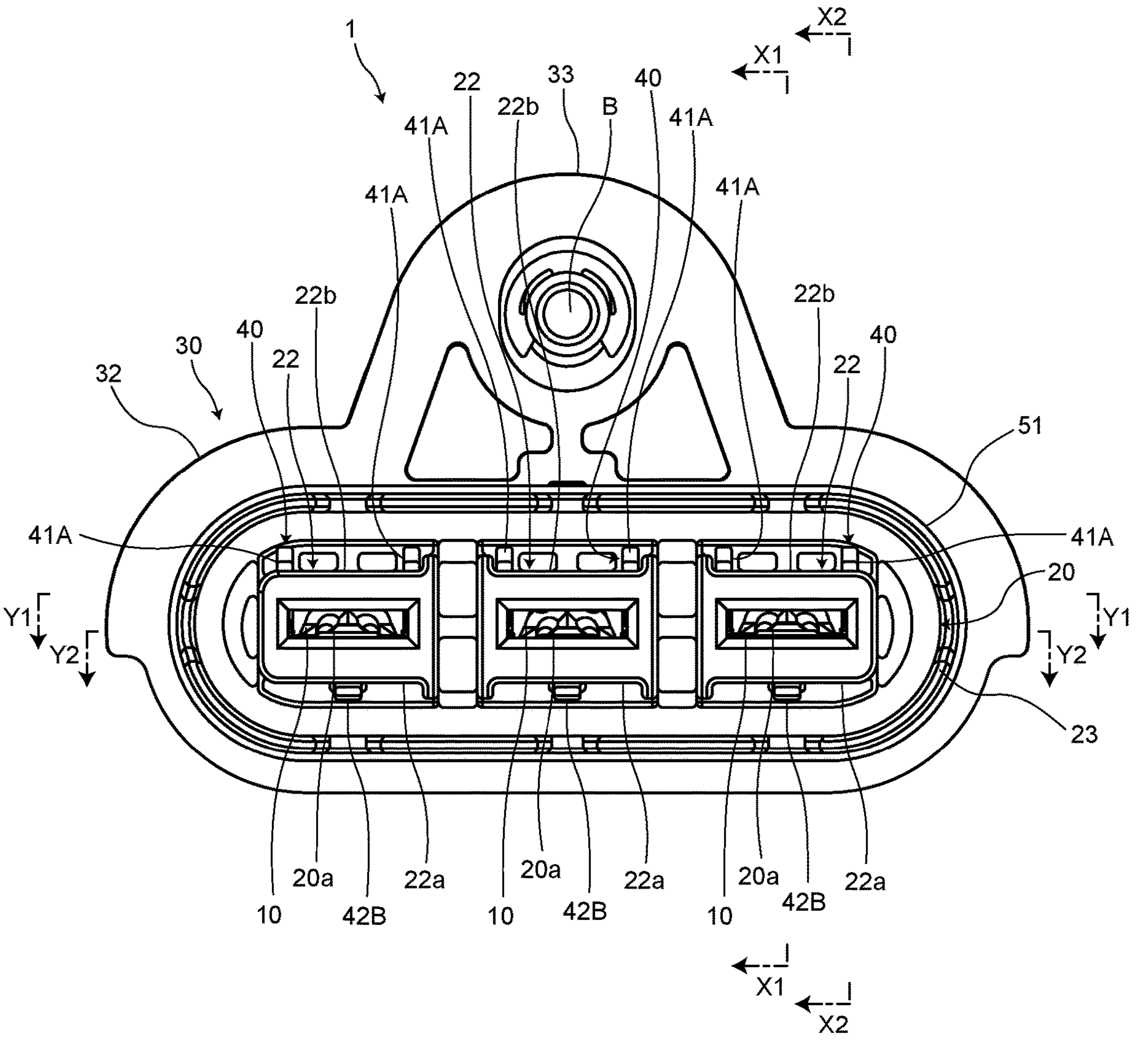
FIG. 3 is a plan view of the connector according to the embodiment as viewed from a terminal accommodating section side.
Figure 8:
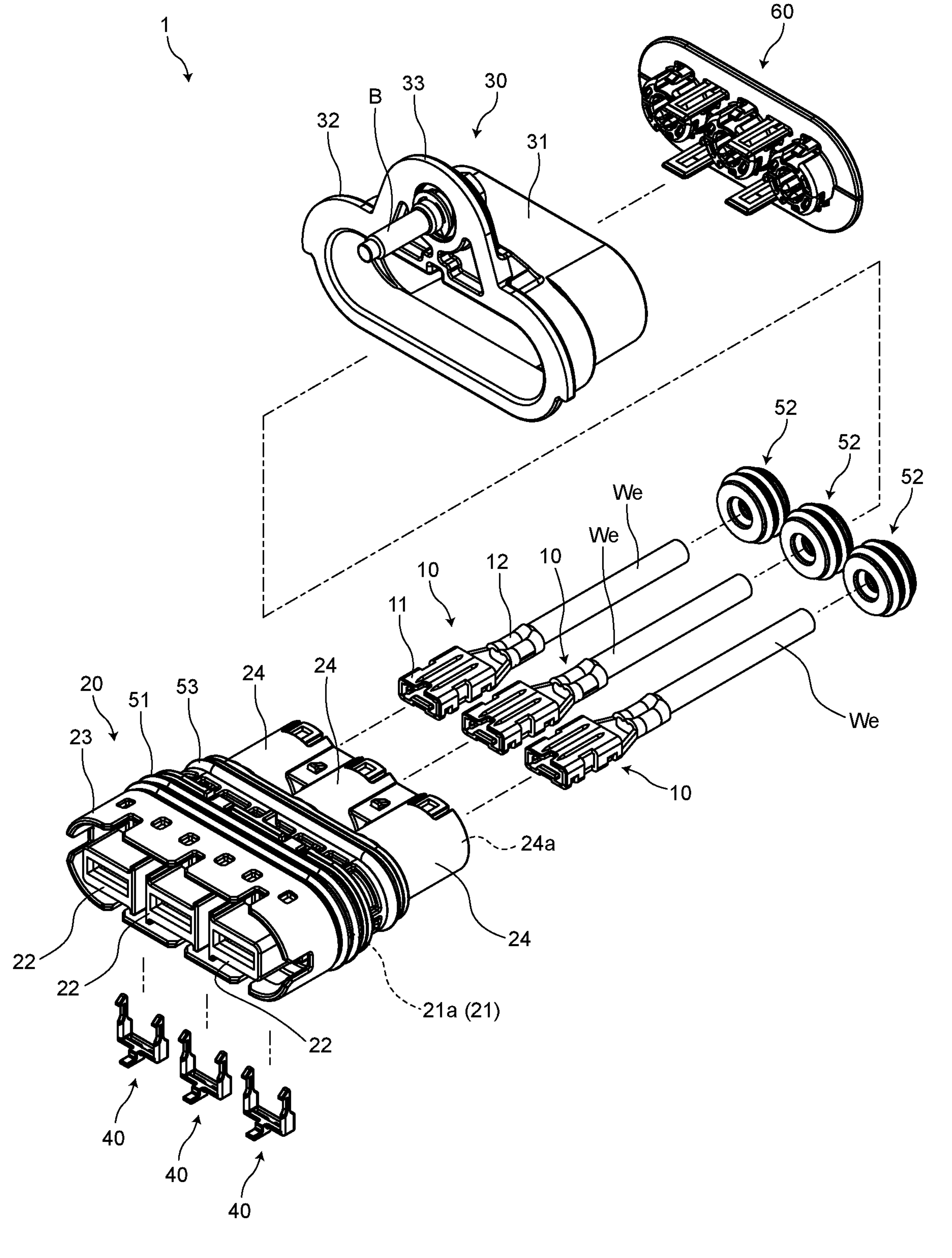
FIG. 8 is an exploded perspective view illustrating the connector according to the embodiment.

The connector 1 includes a terminal fitting 10, a housing 20, a shield shell 30, and a retaining member 40 (FIGS. 3 and 8).

The terminal fitting 10 is formed of a conductive material such as a metal. The terminal fitting 10 is formed in a predetermined shape by press molding such as bending or cutting of a metal plate as a base material. The terminal fitting 10 is attached to the end of the electric wire We in such a way as to be electrically connected to the electric wire We. Further, the terminal fitting 10 is physically and electrically connected to the mating terminal fitting 510 arranged in the mating fitting space 500*b*. Therefore, the terminal fitting 10 includes a terminal connection section 11 physically and electrically connected to the mating terminal fitting 510 and an electric wire connection section 12 physically and electrically connected to the end of the electric wire We (FIG. 8).

The terminal connection section 11 is fitted and connected to a mating terminal connection section 511 of the mating terminal fitting 510, The terminal connection section 11 is formed in a tubular female terminal shape (FIGS. 8 to 10), and the mating terminal connection section 511 is inserted into the terminal connection section 11. As the housing 20 of the connector 1 is fitted into the mating fitting space 500*b* in a housing insertion direction, the mating terminal connection section 511 is inserted into the terminal connection section 11 in a direction opposite to the housing insertion direction.

Figure 2:
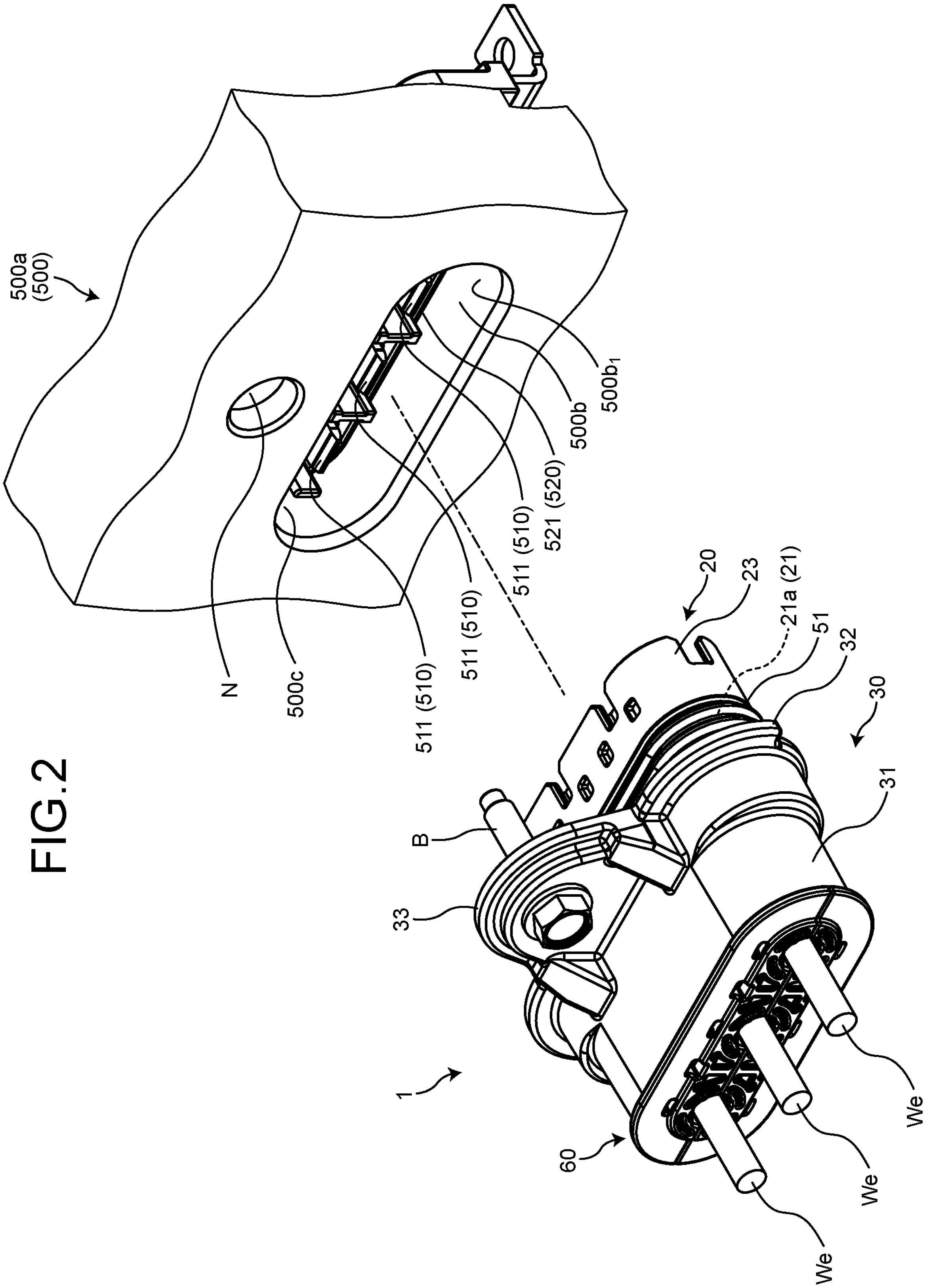
FIG. 2 is a perspective view of the connector according to the embodiment as viewed from another angle together with a mating connector, and illustrates the connectors before fitting connection.
Figure 5:
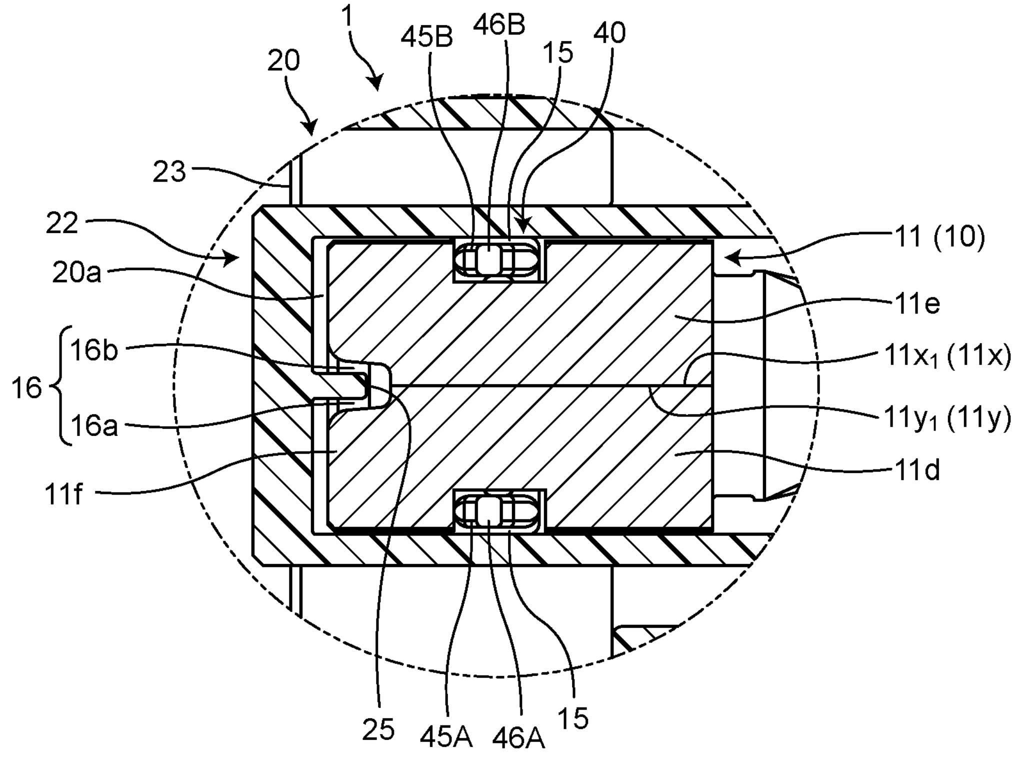
FIG. 5 is a partially enlarged view obtained by rotating a cross section taken along line Y1-Y1 of FIG. 3 by 90 degrees.
Figure 9:
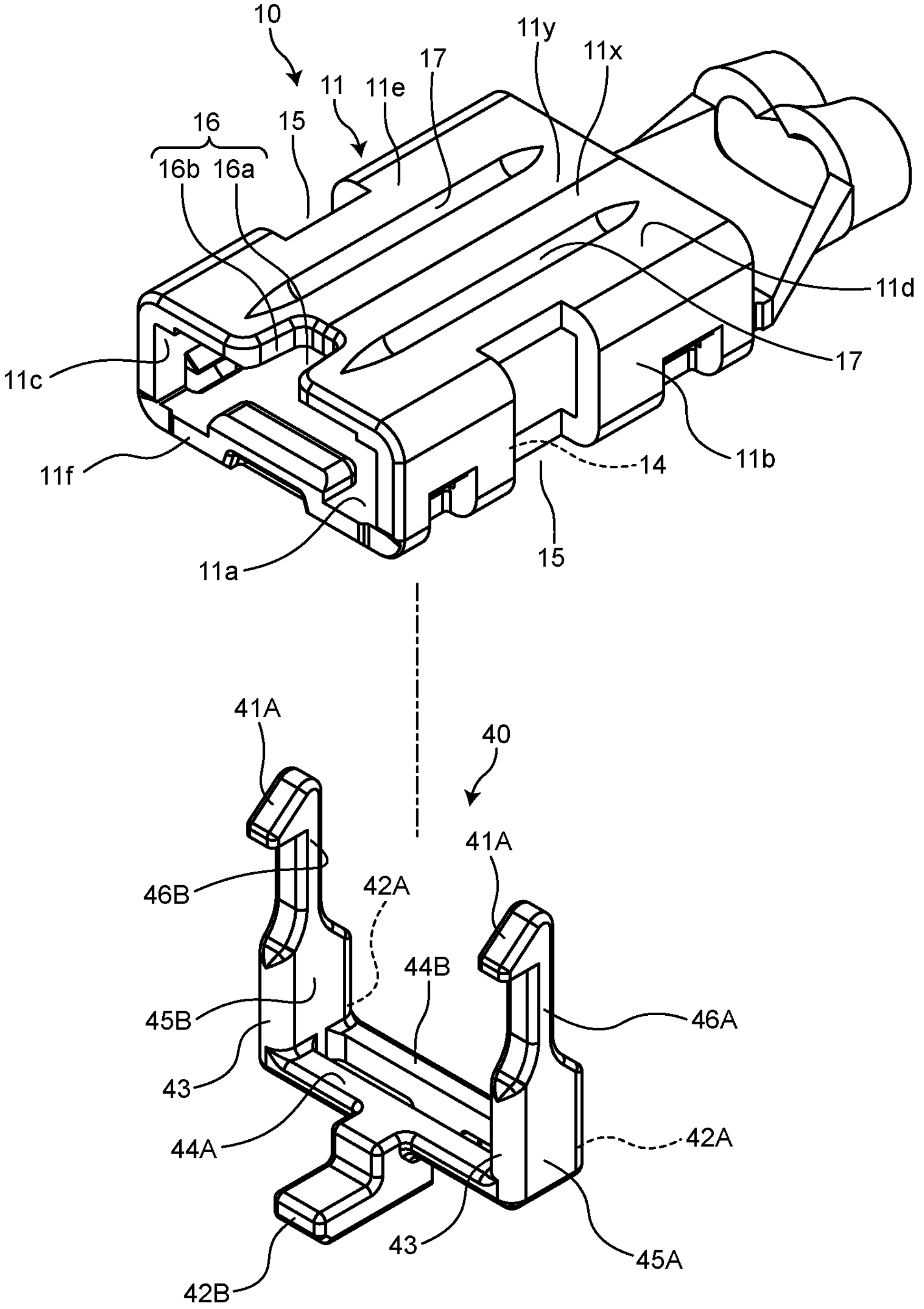
FIG. 9 is an exploded perspective view of a terminal fitting and a retaining member.
Figure 10:
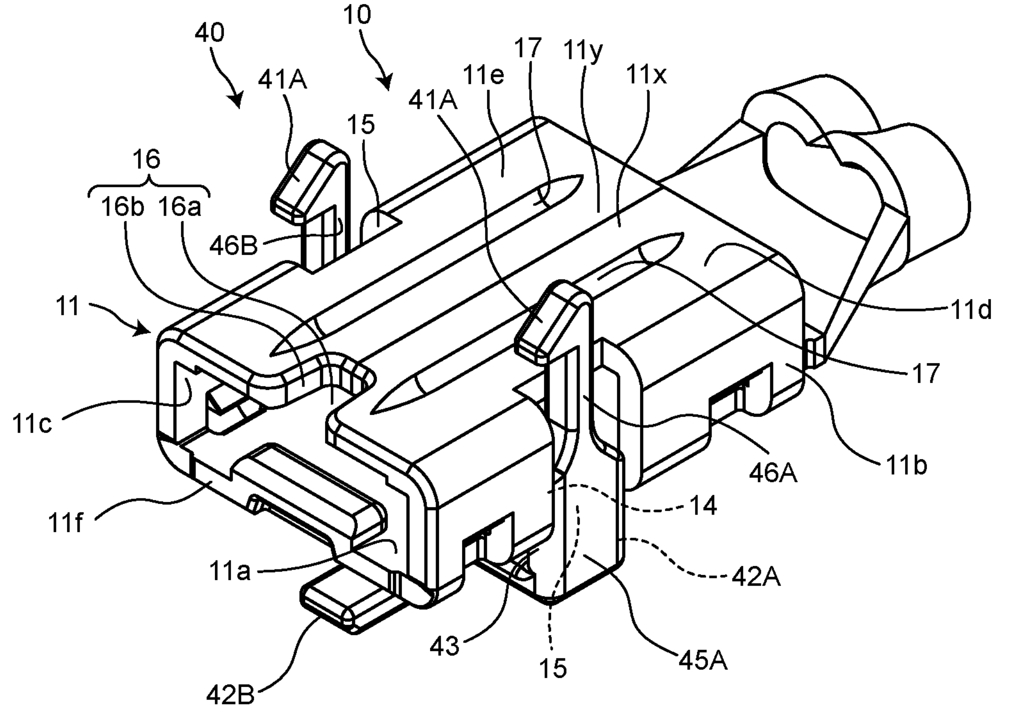
FIG. 10 is a perspective view illustrating the terminal fitting and the retaining member in a locked state.

Specifically, the terminal connection section 11 is formed as a tubular section bent in a tubular shape with end surfaces 11$_{x1}$ and 11$_{y1}$ of two end portions 11*x* and 11*y* facing each other (FIGS. 5, 9, and 10). T Then, the terminal connection section 11 is accommodated at an accommodation completion position of the housing 20 with a terminal insertion direction (an insertion direction of the terminal fitting 10 into the housing 20), which is the same direction as the housing insertion direction, as a tube axis direction. The terminal connection section 11 illustrated here is formed in a square tubular shape having four wall surfaces. The mating terminal connection section 511 illustrated here is formed in a piece-like male terminal shape (so-called male tab shape) (FIG. 2).

The terminal connection section 11 has a first wall 11*a* forming one of the four wall surfaces (FIGS. 9 and 10). In addition, the terminal connection section 11 has a second wall 11*b* and a third wall 11*c* forming two wall surfaces orthogonal to the wall surface of the first wall 11*a*, respectively (FIGS. 9 and 10). In addition, the terminal connection section 11 has a fourth wall 11*d* and a fifth wall 11*e* which are parallel to the wall surface of the first wall 11*a* and form the remaining one wall surface orthogonal to the wall surfaces of the second wall 11*b* and the third wall 11*c* (FIGS. 9 and 10). Each of the first wall 11*a* to the fifth wall 11*e* is formed in a substantially rectangular and substantially flat plate shape. In the terminal connection section 11, the end portion 11*x* of the fourth wall 11*d* and the end portion 11*y* of the fifth wall 11*e* abut on each other on the same plane, and the end surfaces 11$_{x1}$ and 11$_{y1}$ face each other with a minute gap.

Figure 4:
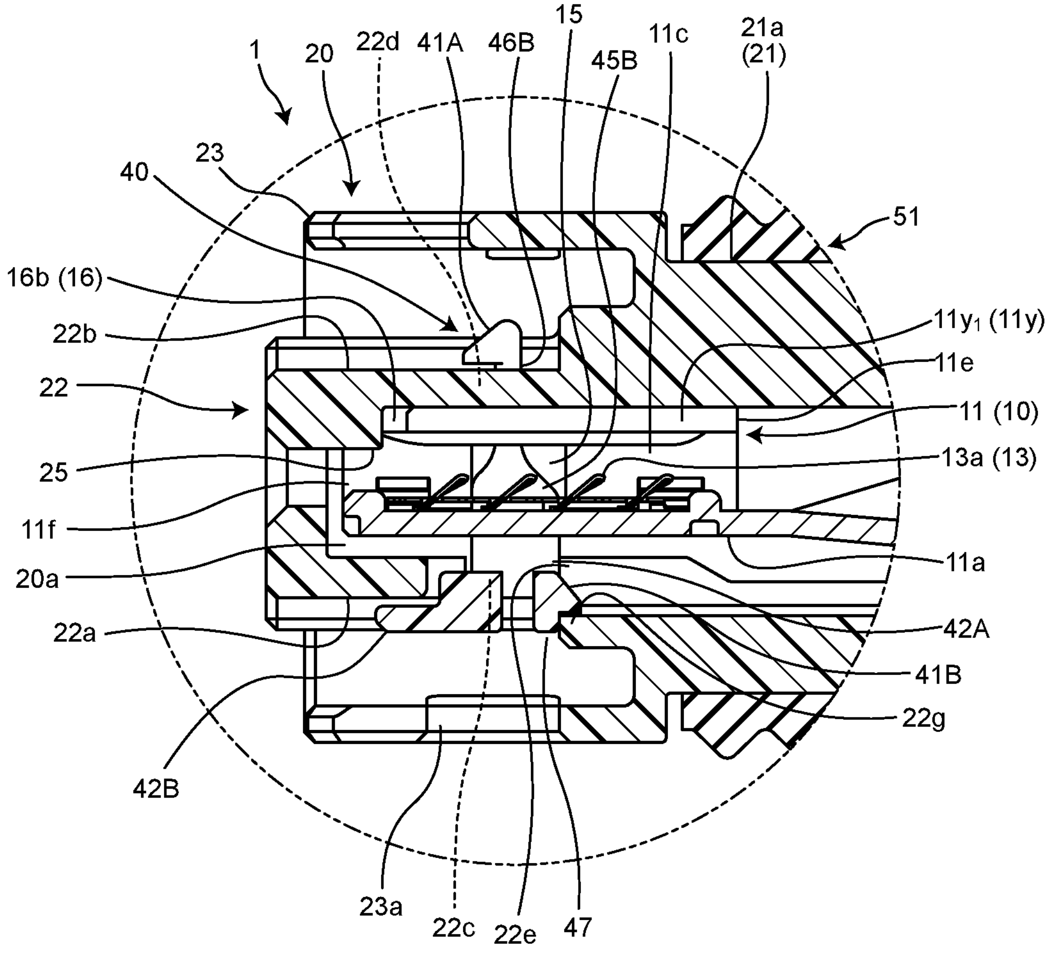
FIG. 4 is a partially enlarged view of a cross section taken along line X1-X1 of FIG. 3.

Further, an integrated or separate elastic contact section 13*a* is provided in the terminal connection section 11 illustrated here (FIG. 4). The elastic contact section 13*a* is a section that ensures a contact pressure between a contact point and the mating terminal connection section 511 by a resilient force accompanying elastic deformation. Here, a contact member 13 separate from the terminal fitting 10 includes the elastic contact section 13*a*. In the connector 1, the elastic contact section 13*a* is arranged inside the terminal connection section 11 by mounting the contact member 13 inside the terminal connection section 11. The elastic contact section 13*a* comes into contact with one plane of the piece-like mating terminal connection section 511, and applies a resilient force in, for example, an orthogonal direction to the plane.

The electric wire connection section 12 is physically and electrically connected to the electric wire We by, for example, being crimped or welded to a core wire of the end of the electric wire We. The electric wire connection section 12 illustrated here is crimped to the core wire by caulking and connecting two barrel pieces to the bare core wire.

The terminal fitting 10 in this example is formed as a straight terminal fitting in which the terminal connection section 11 and the electric wire connection section 12 are arranged on a straight line. Therefore, the electric wire We is led out from the electric wire connection section 12 in an extending direction of the terminal fitting 10 along the straight line. However, in the terminal fitting 10, the terminal connection section 11 and the electric wire connection section 12 may be arranged in such a way as to intersect each other, for example, by orthogonally arranging the terminal connection section 11 and the electric wire connection section 12.

The connector 1 illustrated here includes three pairs of combinations of the terminal fittings 10 and the electric wires We.

The housing 20 is formed of an insulating material such as a synthetic resin. The housing 20 accommodates the terminal fitting 10 and the electric wire We at the accommodation completion position inside of the housing 20. Then, in the housing 20, the terminal fitting 10 is held in an accommodated state at the accommodation completion position, and the electric wire We is led out from the inside to the outside.

The housing 20 includes a fitting wall 21 fitted into the mating fitting space 500*b* through an insertion port 500*c* in the housing insertion direction (FIG. 2). The mating fitting space 500*b* illustrated here is formed as an oval through-hole. Therefore, the fitting wall 21 illustrated here is formed to have an oval outer peripheral surface 21*a* having a shape similar to the mating fitting space 500*b*.

In addition, the housing 20 includes a terminal accommodating section 22 that accommodates the terminal fitting 10 in a terminal accommodating chamber 20*a* in the terminal accommodating section 22 (FIGS. 1 and 3 to 8). The terminal fitting 10 is inserted into the terminal accommodating chamber 20*a* in the terminal insertion direction through an electric wire outlet 24*a* described later. The terminal accommodating section 22 protrudes from the fitting wall 21 in the housing insertion direction, and is inserted into the mating fitting space 500*b* through the insertion port 500*c* together with the fitting wall 21.

Figure 6:
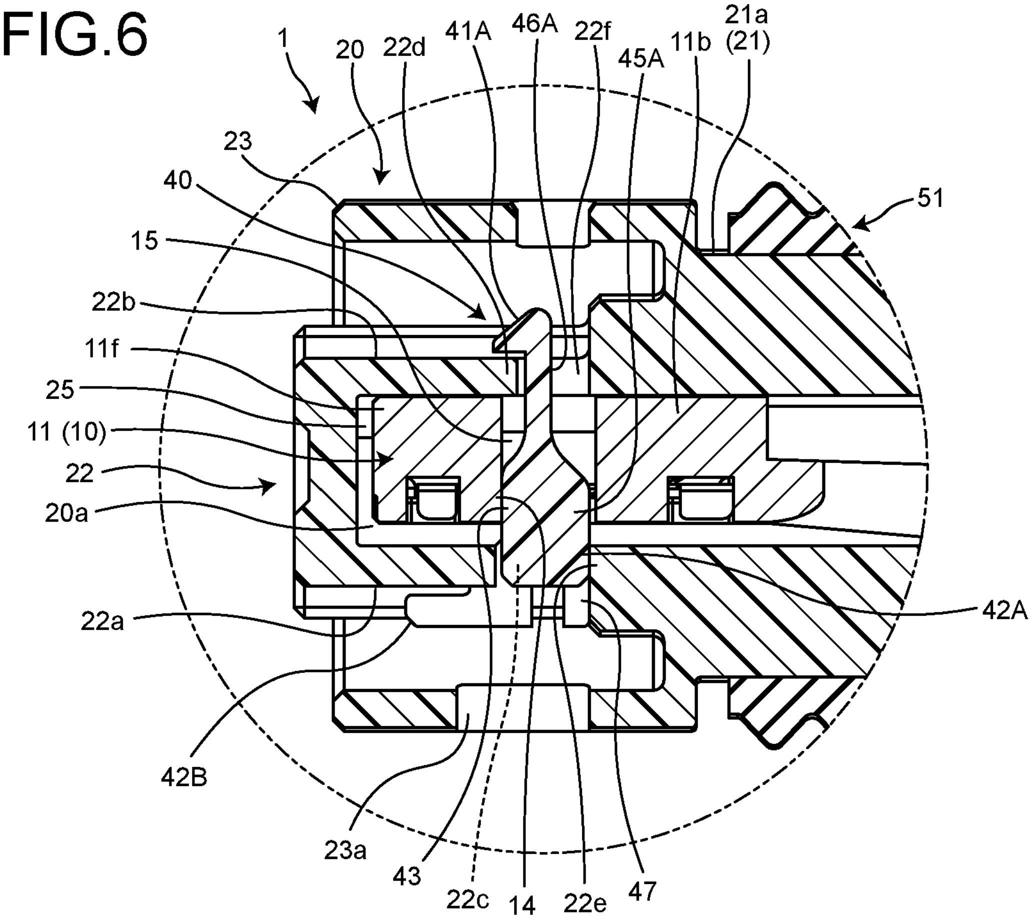
FIG. 6 is a partially enlarged view of a cross section taken along line X2-X2 of FIG. 3.

In the connector 1, in order to generate the contact pressure between the contact point and the mating terminal connection section 511 accompanying the elastic deformation of the elastic contact section 13*a* without excess or deficiency, the terminal fitting 10 is accommodated in the terminal accommodating chamber 20*a* in such a way as to be relatively movable with respect to the mating terminal connection section 511 in a contact pressure acting direction. That is, the connector 1 has a function of aligning the terminal fitting 10 in the contact pressure acting direction. Therefore, the terminal accommodating chamber 20*a* is formed in an indoor space in which the terminal fitting 10 can be relatively moved in an alignment direction orthogonal to the terminal insertion direction and a direction in which the end surfaces $\mathbf{11}_{x1}$ and $\mathbf{11}_{y1}$ of the respective two end portions 11*x* and 11*y* of the terminal connection section 11 face each other. Therefore, the terminal accommodating chamber 20*a* is formed in such a way that the terminal fitting 10 can be arranged while being spaced apart from each of a first wall body 22*a* and a second wall body 22*b* of the terminal accommodating section 22 (FIGS. 4 and 6).

The first wall body 22*a* and the second wall body 22*b* are wall bodies forming the terminal accommodating chamber 20*a* in the terminal accommodating section 22, and are arranged to face each other while being spaced apart from each other in the alignment direction. In addition, in the terminal accommodating chamber 20*a*, the size of the gap between the first wall body 22*a* and the terminal fitting 10 and the size of the gap between the second wall body 22*b* and the terminal fitting 10 are set in such a way that a relative movement amount of the terminal fitting 10 with respect to the mating terminal connection section 511 that can generate a contact pressure between the contact point of the elastic contact section 13*a* and the mating terminal connection section 511 without excess or deficiency can be secured.

The terminal accommodating section 22 illustrated here is formed in a rectangular tubular shape, and the rectangular tubular terminal connection section 11 is accommodated in the terminal accommodating chamber 20*a* inside the terminal accommodating section 22. In the terminal accommodating section 22 illustrated here, one of two pairs of wall bodies arranged to face each other while being spaced apart from each other is the first wall body 22*a* and the second wall body 22*b*. In the terminal accommodating chamber 20*a*, the first wall 11*a* of the terminal connection section 11 is arranged to face the first wall body 22*a*, and the fourth wall 11*d* and the fifth wall 11*e* of the terminal connection section 11 are arranged to face the second wall body 22*b*. Further, in the terminal accommodating section 22 illustrated here, the mating terminal connection section 511 is inserted into the terminal accommodating chamber 20*a* through one opening in the tube axis direction, and the mating terminal connection section 511 is inserted into the terminal connection section 11 in the terminal accommodating chamber 20*a*.

The housing 20 includes the terminal accommodating section 22 for each terminal fitting 10. In the housing 20, the terminal accommodating sections 22 are arranged at intervals in a direction (that is, the direction in which the end surfaces $\mathbf{11}_{x1}$ and $\mathbf{11}_{y1}$ of the respective two end portions 11*x* and 11*y* of the terminal connection section 11 face each other) orthogonal to the terminal insertion direction and the alignment direction. The housing 20 includes a cylindrical hood section 23 that is arranged more toward the housing insertion direction than the fitting wall 21 is and covers a protruding portion of each terminal accommodating section 22 from the fitting wall 21 from the outside while being spaced apart from the protruding portion (FIGS. 1, 3 to 8, and 11 to 13), The hood section 23 illustrated here is formed in an oval cylindrical shape having an oval outer peripheral surface similar in shape to the mating fitting space 500*b*. In the housing 20, an oval cylindrical mating terminal accommodating section 521 (FIG. 2) of a mating housing 520 is fitted into an oval annular gap between the hood section 23 and each terminal accommodating section 22, and at the same time, each mating terminal connection section 511 inside the mating terminal accommodating section 521 is inserted into each terminal accommodating chamber 20*a*. The mating housing 520 is fixed to the casing 500*a* of the mating device 500 and is arranged in the mating fitting space 500*b* of the casing 500*a* (FIG. 2).

In the connector 1 illustrated here, the hood section 23 has an outer peripheral surface having a similar shape larger than the outer peripheral surface 21*a* of the fitting wall 21. The connector 1 includes an annular or tubular sealing member (hereinafter, referred to as a "first sealing member") 51 that fills an annular or tubular gap between the outer peripheral surface 21*a* of the fitting wall 21 and an inner peripheral surface 500*b*1 of the mating fitting space 500*b* in a circumferential direction (FIGS. 1 to 6 and 8). The first sealing member 51 is formed in an oval annular shape or an oval cylindrical shape similar to that of the mating fitting space 500*b*. The first sealing member 51 illustrated here is formed in an oval cylindrical shape similar to the mating fitting space 500*b*, and is mounted on the outer peripheral surface 21*a* of the fitting wall 21.

In the housing 20, a cylindrical electric wire accommodating section 24 in which the electric wire We is accommodated and from which the electric wire We is led out is provided for each electric wire We (FIG. 8). A cylindrical sealing member (hereinafter, referred to as a "second sealing member") 52 that fills a part of a cylindrical gap between an inner peripheral surface of the electric wire accommodating section 24 and an outer peripheral surface of the electric wire We is mounted in the electric wire accommodating section 24 (FIG. 8). The terminal fitting 10 attached to the end of the electric wire We is inserted from the electric wire outlet 24*a* (FIG. 8) of the electric wire accommodating section 24 to the terminal accommodating chamber 20*a*. The connector 1 includes a rear holder 60 fitted into a gap between the electric wire outlet 24*a* of each electric wire accommodating section 24 and the electric wire We (FIGS. 1, 2, and 8).

The shield shell 30 covers each electric wire accommodating section 24 from the outside, thereby suppressing intrusion of noise from the outside into the electric wire We in the electric wire accommodating section 24. Therefore, the shield shell 30 is formed of a metal material (for example, aluminum or an aluminum alloy).

Figure 1:
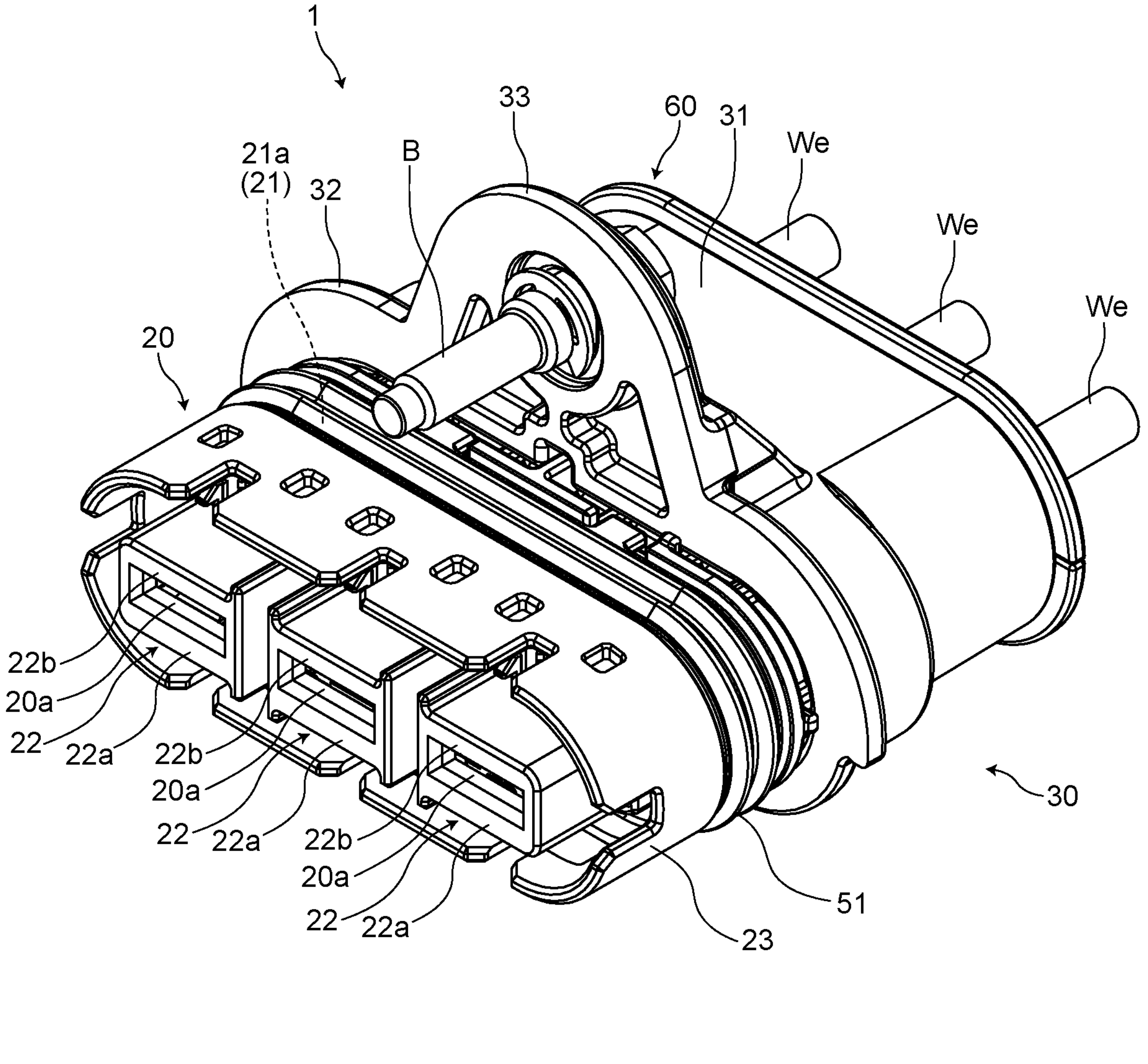
FIG. 1 is a perspective view illustrating a connector according to an embodiment.

The shield shell 30 includes an oval cylindrical section 31 that covers each electric wire accommodating section 24 from the outside (FIGS. 1, 2, and 8). In the housing 20, an oval annular sealing member (hereinafter, referred to as a "third sealing member") 53 is mounted on an oval outer peripheral surface that is more adjacent to the electric wire accommodating section 24 than the fitting wall 21 is (FIG. 8). The third sealing member 53 is a waterproof member that fills a part of an oval cylindrical gap between the oval outer peripheral surface of the housing 20 and an inner peripheral surface of the cylindrical section 31 of the shield shell 30.

An oval annular flange section 32 is connected to the cylindrical section 31 (FIGS. 1 to 3 and 8). In the shield shell 30, a fixing section 33 protruding from the flange section 32 is screwed and fixed to a female screw section N of the casing 500*a* of the mating device 500 with a male screw member B (FIG. 2).

The retaining member 40 is formed of an insulating material such as a synthetic resin. The retaining member 40 is mounted on the terminal accommodating section 22. The retaining member 40 suppresses positional deviation of the terminal fitting 10 toward the electric wire outlet 24*a* and prevents the terminal fitting 10 from coming off from the electric wire outlet 24*a* at a mounting completion position. That is, the retaining member 40 blocks movement of the terminal fitting 10 with respect to the terminal accommodating section 22 in a terminal removal direction opposite to the terminal insertion direction at the mounting completion position, and holds the terminal fitting 10 in the terminal accommodating chamber 20*a* at the accommodation completion position. The retaining member 40 may be provided for each terminal fitting 10, may be provided for a plurality of terminal fittings 10, or may be intended for retaining all the terminal fittings 10. Here, one retaining member 40 is provided for each terminal fitting 10.

The retaining member 40 is held by the terminal accommodating section 22 at the mounting completion position with respect to the terminal accommodating section 22. Therefore, a held section 41A held by the terminal accommodating section 22 is provided in the retaining member 40 (FIGS. 4, 6, and 9 to 12). Furthermore, a locked section (hereinafter, referred to as a "first locked section") 42A that causes the terminal accommodating section 22 to block movement with respect to the terminal accommodating section 22 in the terminal removal direction is provided in the retaining member 40 (FIGS. 4, 6, and 9 to 11). Meanwhile, the terminal accommodating section 22 includes a retainer insertion hole 22*c* through which the retaining member 40 is inserted into the terminal accommodating chamber 20*a* in a retainer insertion direction directed in one alignment direction, and a retainer holding section 22*d* that is arranged to face a held section 41A of the retaining member 40 at the mounting completion position in the retainer removal direction opposite to the retainer insertion direction and blocks movement of the held section 41A in the retainer removal direction (FIGS. 4, 6, and 11 to 13). Further, the terminal accommodating section 22 includes a retainer locking section 22*e* that is arranged to face the first locked section 42A of the retaining member 40 at the mounting completion position in the terminal removal direction and blocks movement of the first locked section 42A of the retaining member 40 in the terminal removal direction (FIGS. 4 and 6).

In the terminal accommodating section 22 illustrated here, the first wall body 22*a* includes the retainer insertion hole 22*c* (FIGS. 4, 6, 11, and 13). The retainer insertion hole 22*c* is a through-hole through which the retaining member 40 is inserted from the first wall body 22*a* side toward the second wall body 22*b* side. Furthermore, in the first wall body 22*a*, a peripheral wall of the retainer insertion hole 22*c* in the terminal removal direction is used as the retainer locking section 22*e* (FIGS. 4 and 6).

Figure 11:
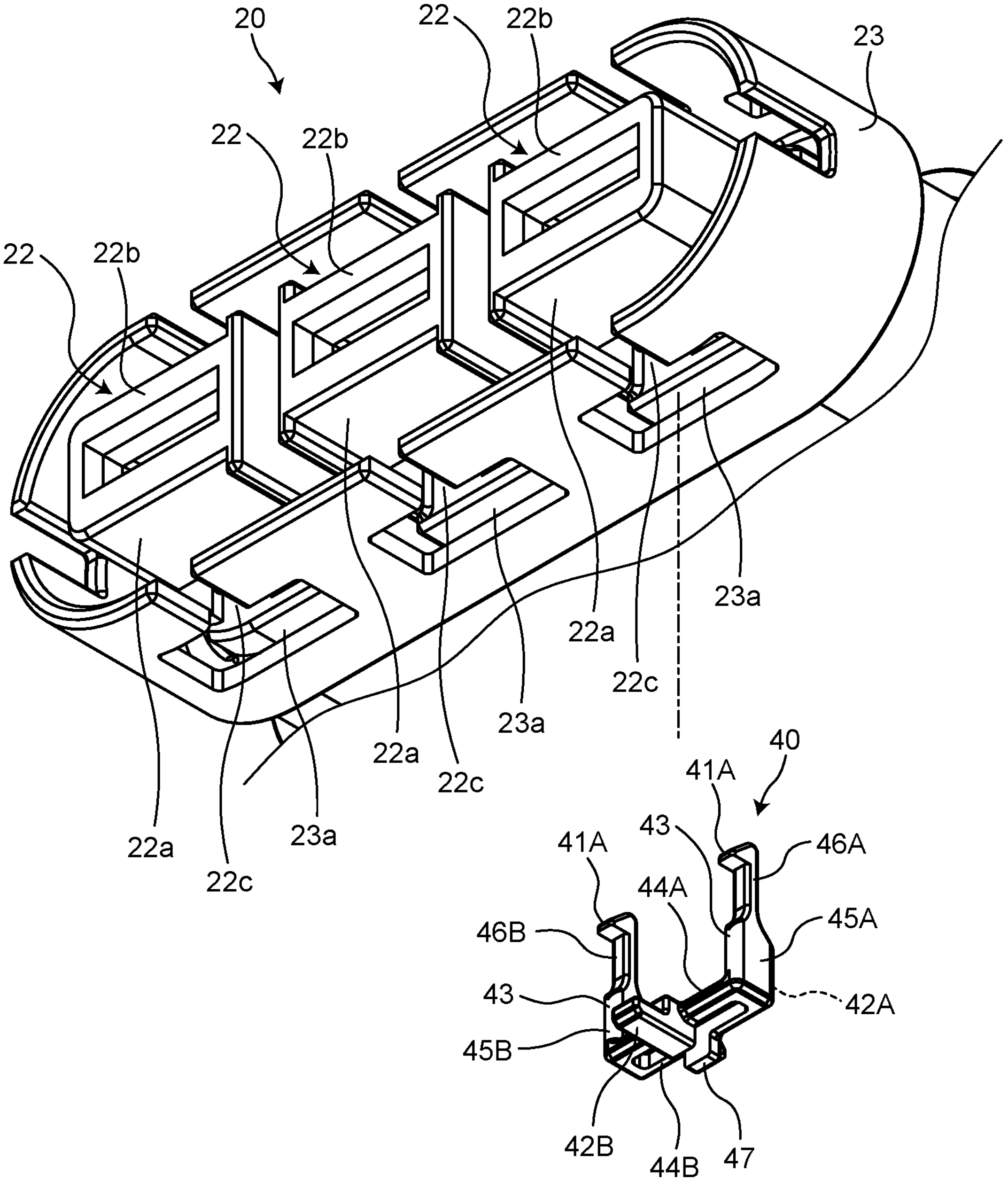
FIG. 11 is an exploded perspective view of the terminal accommodating section and the retaining member.

The retainer insertion hole 22*c* is covered by the hood section 23 from the outside. Therefore, in the housing 20, a through-hole 23*a* is provided at a position facing the retainer insertion hole 22*c* in the hood section 23, and the retaining member 40 is inserted into the retainer insertion hole 22*c* through the through-hole 23*a* (FIGS. 4, 6, and 11).

Figure 12:
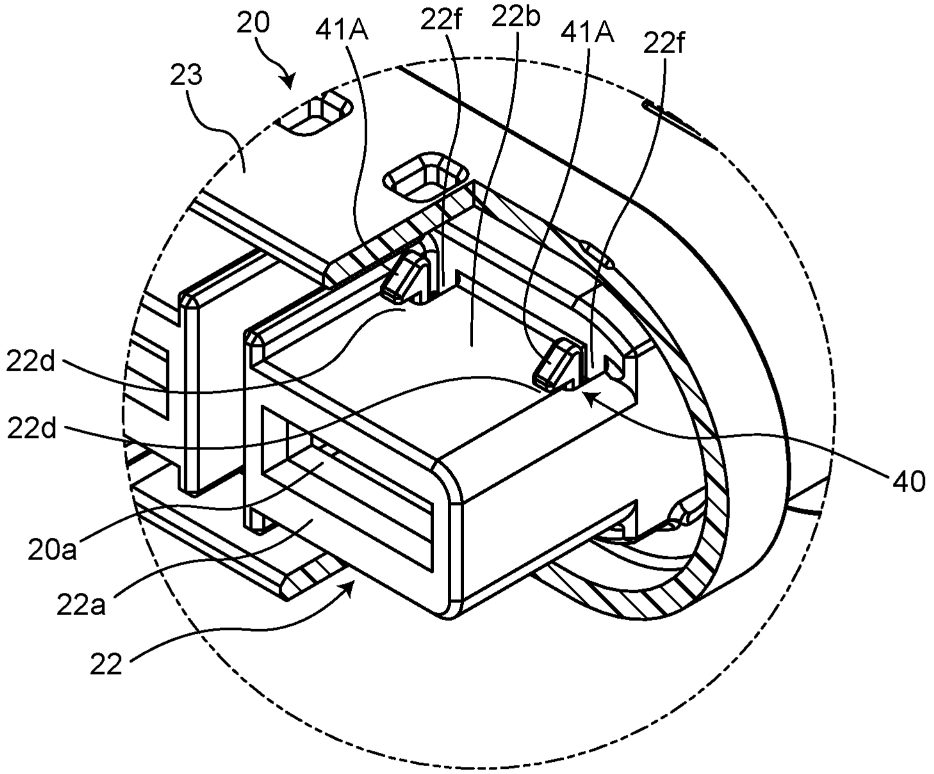
FIG. 12 is a partially cut-away perspective view of the housing, illustrating the terminal accommodating section and the retaining member in an inward locked state.

In the terminal accommodating section 22 illustrated here, the second wall body 22*b* includes a retainer inserting hole 22*f* through which the held section 41A of the retaining member 40 is inserted from the terminal accommodating chamber 20*a* to the outside (FIGS. 6 and 12). The retainer inserting hole 22*f* is a through-hole through which the held section 41A inserted into the terminal accommodating chamber 20*a* through the retainer insertion hole 22*c* is removed from the terminal accommodating chamber 20*a* to the outside in the retainer insertion direction. Furthermore, in the second wall body 22*b*, a peripheral wall of the retainer inserting hole 22*f* is used as the retainer holding section 22*d* (FIGS. 6 and 12). As the retainer holding section 22*d* of the second wall body 22*b* illustrated here, the peripheral wall of the retainer inserting hole 22*f* in the terminal insertion direction in the second wall body 22*b* is used. The held section 41A illustrated here is formed as a protrusion that protrudes in the terminal insertion direction and causes the peripheral wall of the retainer inserting hole 22*f* in the terminal insertion direction to be arranged to face the retaining member 40 in the retainer removal direction when the retaining member 40 is at the mounting completion position (FIG. 6). Here, the held section 41A is formed in a claw shape.

Furthermore, in the connector 1 illustrated here, in addition to a combination of the held section 41A and the retainer holding section 22*d*, another combination of a held section 41B and a retainer holding section 22*g* is provided (FIG. 4). That is, the retaining member 40 includes, separately from the one held section 41A locked to the retainer holding section 22*d* of the second wall body 22*b*, the other held section 41B held by the terminal accommodating section 22. In addition to the one retainer holding section 22*d* provided in the second wall body 22*b*, the terminal accommodating section 22 includes the other retainer holding section 22*g* that is arranged to face the other held section 41B of the retaining member 40 at the mounting completion position in the retainer removal direction and blocks movement of the other held section 41B in the retainer removal direction. The other retainer holding section 22*g* is provided at the first wall body 22*a*. For example, as the other retainer holding section 22*g* of the first wall body 22*a* illustrated here, a peripheral wall of the retainer insertion hole 22*c* in the terminal removal direction in the first wall body 22*a* is used. The other held section 41B illustrated here is formed as a protrusion that protrudes in the terminal removal direction and causes the peripheral wall of the retainer insertion hole 22*c* in the terminal removal direction to be arranged to face the retaining member 40 in the retainer removal direction when the retaining member 40 is at the mounting completion position. Here, the other held section 41B is formed in a claw shape.

Furthermore, in the connector 1 illustrated here, two sets of combinations of the one held sections 41A and the retainer holding sections 22*d* are provided (FIG. 12), and one set of the combination of the other held section 41B and the retainer holding section 22*g* is provided (FIG. 4). The connector 1 illustrated here includes two sets of combinations of the first locked section 42A and the retainer locking section 22*e*. In the connector 1 illustrated here, the retaining member 40 is held by the terminal accommodating section 22 at the mounting completion position with respect to the terminal accommodating section 22 by the two sets of the combinations of the one held sections 41A and the retainer holding sections 22*d*, the one set of the combination of the other held section 41B and the retainer holding section 22*g*, and the two sets of the combinations of the first locked sections 42A and the retainer locking section 22*e*.

The retaining member 40 blocks movement of the terminal fitting 10 with respect to the terminal accommodating section 22 in the terminal removal direction at the mounting completion position with respect to the terminal accommodating section 22, Therefore, the retaining member 40 includes a terminal locking section 43 that is arranged to face the terminal fitting 10 in the terminal removal direction at the mounting completion position with respect to the terminal accommodating section 22 and blocks movement of the terminal fitting 10 in the terminal removal direction (FIGS. 6, 7, and 9 to 11). Meanwhile, the terminal fitting 10 includes a locked section 14 that is arranged to face the terminal locking section 43 of the retaining member 40 at the mounting completion position in the terminal insertion direction and causes the terminal locking section 43 to block movement in the terminal removal direction (FIGS. 6, 7, 9, and 10). Further, the terminal fitting 10 includes a retainer accommodating section 15 that accommodates the terminal locking section 43 of the retaining member 40 at the mounting completion position and can relatively move with respect to the terminal locking section 43 in the alignment direction (FIGS. 4, 6, 7, 9, and 10).

The retainer accommodating section 15 illustrated here is formed in the second wall 11*b* and the third wall 11*c* of the terminal connection section 11 by cutting each of the second wall 11*b* and the third wall 11*c* (FIGS. 9 and 10). Each retainer accommodating section 15 is a space obtained by cutting a part of each of the second wall 11*b* and the third wall 11*c* in the alignment direction. Therefore, the retaining member 40 includes the terminal locking section 43 for each retainer accommodating section 15. Each retainer accommodating section 15 causes each retaining member 40 to accommodate the terminal locking section 43 when the retaining member 40 is at the mounting completion position, so that the wall of the terminal accommodating section 22 is present more toward the terminal insertion direction than the terminal locking section 43 is. Therefore, as the locked section 14 of the terminal fitting 10 illustrated here, a peripheral wall of each retainer accommodating section 15 in the terminal insertion direction is used.

Figure 7:
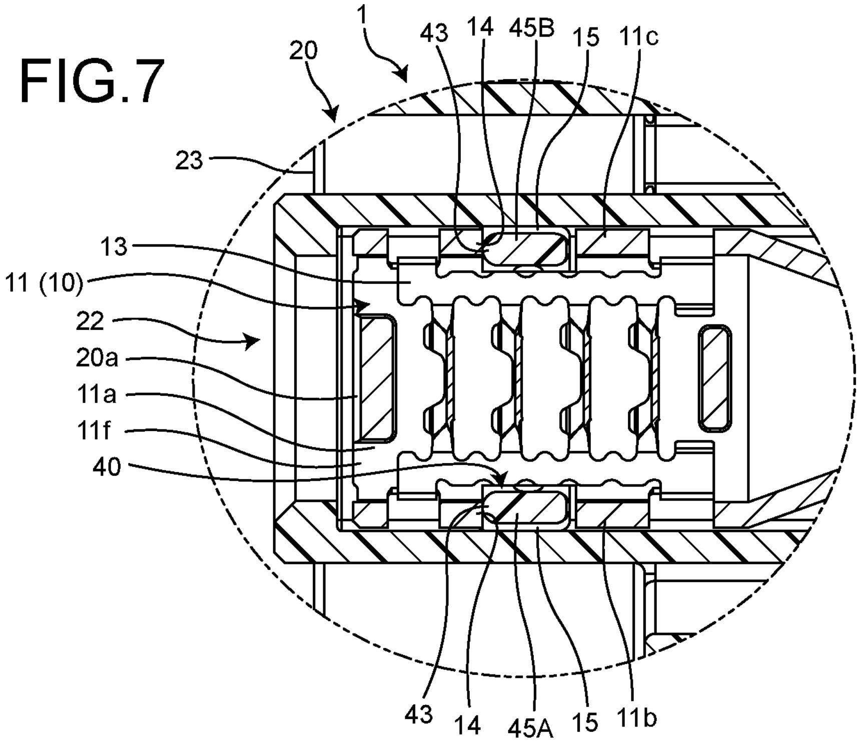
FIG. 7 is a partially enlarged view obtained by rotating a cross section taken along line Y2-Y2 of FIG. 3 by 90 degrees.
Figure 13:
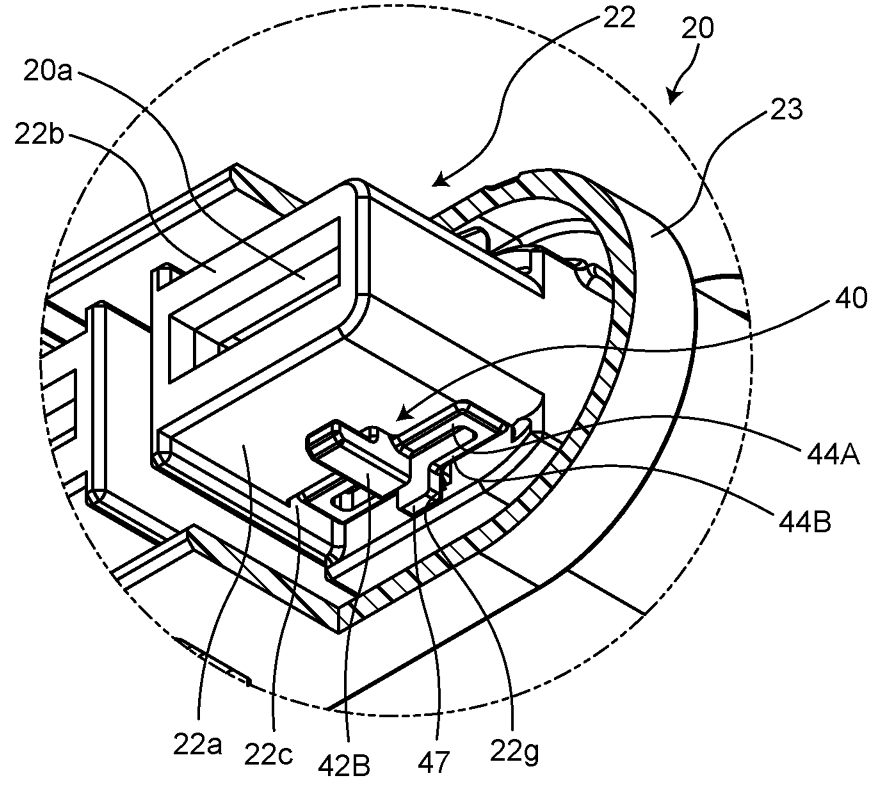
FIG. 13 is a partially cut-away perspective view of the housing, illustrating the terminal accommodating section and the retaining member in an inward locked state when viewed from a different angle.

Specifically, the retaining member 40 illustrated here includes a first shaft section 44A and a second shaft section 44B that are arranged to face each other while being spaced apart from each other in the terminal insertion direction and have a shaft shape extending in a direction orthogonal to the terminal insertion direction and the alignment direction (FIGS. 9, 11, and 13). The retaining member 40 illustrated here includes a piece-like first piece section 45A that connects one end portions of the first shaft section 44A and the second shaft section 44B to each other and extends in the retainer insertion direction from the end portion side, and a piece-like second piece section 45B that connects the other end portions of the first shaft section 44A and the second shaft section 44B to each other and extends in the retainer insertion direction from the end portion side (FIGS. 7, 9, and 11).

Here, the first shaft section 44A is arranged on the terminal insertion direction side, and the second shaft section 44B is arranged on the terminal removal direction side. In the retaining member 40, the second shaft section 44B held by both the first piece section 45A and the second piece section 45B has flexibility and is thus capable of being bent in, for example, the terminal insertion direction and the terminal removal direction. In the retaining member 40, the first shaft section 44A and the second shaft section 44B are arranged in the retainer insertion hole 22*c* at the mounting completion position with respect to the terminal accommodating section 22. Therefore, the retainer insertion hole 22*c* is formed in a shape and size in which the first shaft section 44A and the second shaft section 44B can be arranged.

In the retaining member 40, end portions of the first piece section 45A and the second piece section 45B in the terminal insertion direction are used as the terminal locking section 43 (FIGS. 9 and 11). Therefore, in the retaining member 40, at the mounting completion position with respect to the terminal accommodating section 22, the first piece section 45A is accommodated in one retainer accommodating section 15, and the second piece section 45B is accommodated in the other retainer accommodating section 15. Further, in the retaining member 40, end portions of the first piece section 45A and the second piece section 45B in the terminal removal direction are used as the first locked section 42A (FIG. 9).

In addition, the retaining member 40 illustrated here includes a shaft-like cantilevered first flexible section 46A extending from the first piece section 45A in the retainer insertion direction and having flexibility, and a shaft-like second flexible section 46B extending from the second piece section 45B in the retainer insertion direction and having flexibility (FIGS. 9 to 11). The first flexible section 46A and the second flexible section 46B have flexibility and are thus capable of being bent in the terminal insertion direction and the terminal removal direction. The one held section 41A is provided at a free end of each of the first flexible section 46A and the second flexible section 46B.

In addition, the retaining member 40 illustrated here includes a protruding section 47 protruding in the retainer removal direction from the center of the second shaft section 44B in the extending direction (FIGS. 4, 6, 11, and 13). The protruding section 47 illustrated here is formed in a rectangular parallelepiped shape, and the other held section 41B protrudes from a wall surface on the terminal removal direction side (FIG. 4).

In addition, the retaining member 40 illustrated here includes a locked section (hereinafter, referred to as a "second locked section") 42B locked to the terminal accommodating section 22 in such a way as not to be pushed in the retainer insertion direction beyond the mounting completion position with respect to the terminal accommodating section 22 (FIGS. 4, 6, 9 to 11, and 13). The second locked section 42B protrudes in the retainer removal direction and the terminal insertion direction from the center of the first shaft section 44A in the extending direction, and is locked to the second wall body 22*b* of the terminal accommodating section 22.

Meanwhile, in the connector 1, even when the terminal fitting 10 is rotated by 180 degrees around the tube axis of the terminal connection section 11, the terminal fitting 10 can be inserted into the terminal accommodating chamber 20*a*. Therefore, it is necessary that the connector 1 is configured to be able to detect erroneous insertion of the terminal fitting 10 to suppress such erroneous insertion of the terminal fitting 10. Further, in the connector 1, since the terminal fitting 10 can be relatively moved in the alignment direction in the terminal accommodating chamber 20*a*, even in case where the terminal fitting 10 is erroneously inserted, the mating terminal connection section 511 can be fitted and connected to the terminal connection section 11, and there is a possibility that erroneous insertion of the terminal fitting 10 cannot be detected. In addition, in the connector 1, even in a case where the terminal fitting 10 is erroneously inserted, the retaining member 40 can be inserted up to the mounting completion position with respect to the terminal accommodating section 22, so that erroneous insertion of the terminal fitting 10 cannot be detected even with the retaining member 40.

Therefore, in the connector 1, the following erroneous insertion detection structure of the terminal fitting 10 is provided. The erroneous insertion detection structure includes the terminal connection section 11 and the terminal accommodating section 22.

First, the terminal connection section 11 includes a recess 16 recessed from a distal end 11*f* on the terminal insertion direction side in the terminal removal direction (FIGS. 4, 5, 9, and 10). The recess 16 is formed by two cut portions 16*a* and 16*b* obtained by cutting corner portions of the distal end 11*f* of the terminal connection section 11 on the two end portions 11*x* and 11*y* sides (FIGS. 5, 9, and 10). One cut portion 16*a* is obtained by cutting the corner portion of the distal end 11*f* on the terminal insertion direction side in the end portion 11*x* of the fourth wall 11*d*, The other cut portion 16*b* is obtained by cutting the corner portion of the distal end 11*f* on the terminal insertion direction side in the end portion 11*y* of the fifth wall 11*e* in a rectangular shape. The two cut portions 16*a* and 16*b* illustrated here have the same rectangular shape and the same size. Therefore, the recess 16 illustrated here is formed in a rectangular shape by the two cut portions 16*a* and 16*b*.

Next, the terminal accommodating section 22 includes a projection 25 to be inserted into the recess 16 of the terminal connection section 11 at the accommodation completion position from the distal end 11*f* side (FIGS. 4 to 6). The projection 25 is formed in such a way that a width in the direction in which the end surfaces $\mathbf{11}_{x1}$ and $\mathbf{11}_{y1}$ of the respective two end portions 11*x* and 11*y* in the terminal connection section 11 face each other is larger than a gap between the end surfaces $\mathbf{11}_{x1}$ and $\mathbf{11}_{y1}$ of the two end portions 11*x* and 11*y*. Further, the projection 25 is formed in such a way that the size of the terminal fitting 10 in the alignment direction is larger than the maximum relative movement amount of the terminal fitting 10 in the terminal accommodating chamber 20*a* in the alignment direction.

As a result, in the erroneous insertion detection structure of the terminal fitting 10, in a case where the terminal fitting 10 is inserted into the terminal accommodating chamber 20*a* in the correct insertion posture, the projection 25 of the terminal accommodating section 22 is inserted into the recess 16 of the terminal connection section 11 (FIGS. 4 and 5). Therefore, in the erroneous insertion detection structure, in a case where the terminal fitting 10 is inserted into the terminal accommodating chamber 20*a* in the correct insertion posture, the terminal fitting 10 can be inserted up to the accommodation completion position. Here, since the width of the projection 25 is larger than the gap between the end surfaces $\mathbf{11}_{x1}$ and $\mathbf{11}_{y1}$ of the two end portions 11*x* and 11*y*, the terminal fitting 10 is not inserted deeper than the accommodation completion position.

Figure 14:
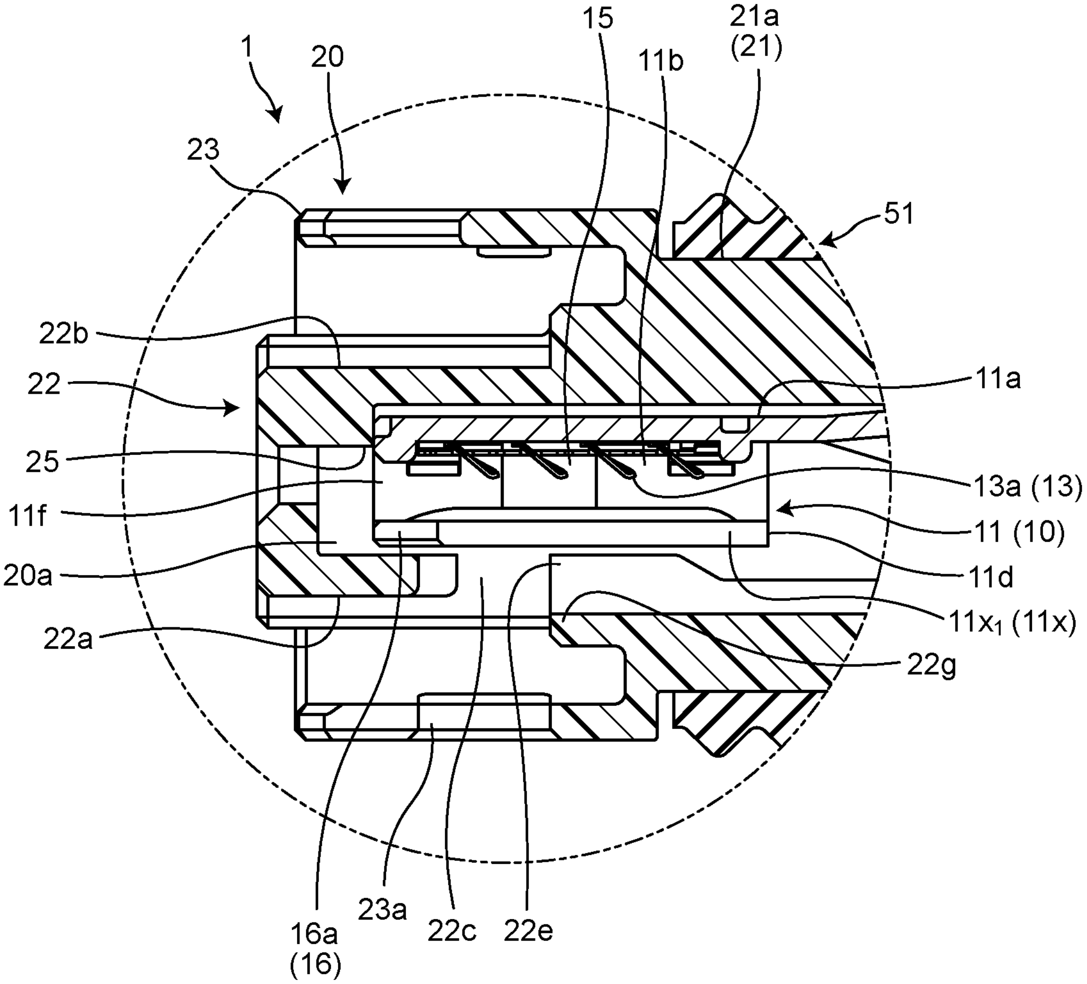
FIG. 14 is a partially enlarged view corresponding to the cross section taken along line X1-X1 of FIG. 3, and illustrates erroneous insertion of the terminal fitting.

Meanwhile, in the erroneous insertion detection structure of the terminal fitting 10, in a case where the terminal fitting 10 is inserted into the terminal accommodating chamber 20*a* in the incorrect insertion posture rotated by 180 degrees about the tube axis of the terminal connection section 11, the distal end 11*f* of the terminal connection section 11 (the distal end 11*f* of the first wall 11*a*) is caught to the projection 25 of the terminal accommodating section 22 (FIG. 14). Therefore, in the erroneous insertion detection structure, in a case where the terminal fitting 10 is inserted into the terminal accommodating chamber 20*a* in the erroneous insertion posture, when the distal end 11*f* of the terminal connection section 11 is caught to the projection 25, the insertion of the terminal fitting 10 deeper than this is suppressed, and the terminal fitting 10 is not allowed to reach the accommodation completion position. Therefore, this erroneous insertion detection structure can cause, for example, an operator or the like to detect erroneous insertion of the terminal fitting 10.

Furthermore, in this erroneous insertion detection structure, the recess 16 is formed by the two cut portions 16*a* and 16*b* obtained by cutting the corner portions of the distal end 11*f* of the terminal connection section 11 on the two end portions 11*x* and 11*y* sides. Therefore, for example, as compared with a case where the second wall 11*b* or the third wall 11*c* is cut to form a recess having the same size as the recess 16, a cut region in one wall is small, and it is possible to suppress a decrease in strength of the terminal connection section 11. Therefore, the connector 1 according to the present embodiment can suppress erroneous insertion of the terminal fitting 10 and a decrease in strength.

Here, the terminal connection section 11 includes reinforcing sections 17, 17 extending in the terminal removal direction from positions adjacent to the cut portion 16*a* (16*b*) in the direction in which the end surfaces $\mathbf{11}_{x1}$ and $\mathbf{11}_{y1}$ face each other for the cut portions 16*a* and 16*b* (FIGS. 9 and 10). For example, each of the reinforcing sections 17, 17 illustrated here is formed in a so-called bead shape in which a part of each of the fourth wall 11*d* and the fifth wall 11*e* bulges. Thus, the connector 1 can further suppress a decrease in strength of the terminal fitting 10. In addition, each of the reinforcing sections 17 illustrated here has a so-called bead shape in which a part of each of the fourth wall 11*d* and the fifth wall 11*e* bulges toward the inside of the terminal connection section 11, and is formed as an electrical contact section that sandwiches the mating terminal connection section 511 between the reinforcing section 17 and the elastic contact section 13*a* of the contact member 13 arranged in the terminal connection section 11.

In the connector according to the present embodiment, in a case where the terminal fitting is inserted into the terminal accommodating chamber in the correct insertion posture, the projection of the terminal accommodating section is inserted into the recess of the terminal connection section. Therefore, in the connector, in a case where the terminal fitting is inserted into the terminal accommodating chamber in the correct insertion posture, the terminal fitting can be inserted up to the accommodation completion position. Meanwhile, in the connector, in a case where the terminal fitting is inserted into the terminal accommodating chamber in the incorrect insertion posture rotated by 180 degrees about the tube axis of the terminal connection section, the distal end of the terminal connection section is caught to the projection of the terminal accommodating section. Therefore, in the connector, in a case where the terminal fitting is inserted into the terminal accommodating chamber in the erroneous insertion posture, when the distal end of the terminal connection section is caught to the projection, the deeper insertion of the terminal fitting is suppressed, and the terminal fitting is not allowed to reach the accommodation completion position. Therefore, in the connector, for example, an operator or the like can detect erroneous insertion of the terminal fitting. Furthermore, in the connector, the recess is formed by two cut portions obtained by cutting the corner portions of the distal end of the terminal connection section on the two end portions sides. Therefore, for example, as compared with a case where one wall is cut to form a recess having the same size as the above-described recess, a cut region in one wall is small, and it is possible to suppress a decrease in strength of the terminal connection section. Therefore, the connector according to the present embodiment can suppress erroneous insertion of the terminal fitting and a decrease in strength.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:

a terminal fitting that includes a terminal connection section physically and electrically connected to a mating terminal fitting; and a housing that includes a terminal accommodating section in which the terminal fitting is inserted into a terminal accommodating chamber in the terminal accommodating section in a terminal insertion direction and accommodated at an accommodation completion position, wherein the terminal connection section is a tubular section bent in a tubular shape with end surfaces of two end portions facing each other, and includes a recess that is recessed from a distal end of the terminal connection section on a terminal insertion direction side, in a terminal removal direction opposite to the terminal insertion direction, the terminal insertion direction being a tube axis direction, the recess is formed by two cut portions obtained by cutting corner portions of the distal end of the terminal connection section on two end portion sides, and the terminal accommodating section includes a projection that is inserted into the recess of the terminal connection section at the accommodation completion position from a distal end side.

2. The connector according to claim 1, wherein the terminal connection section includes, for each of the cut portions, a reinforcing section extending in the terminal removal direction from a position adjacent to the cut portion in a direction in which the end surfaces of the respective two end portions face each other.

3. The connector according to claim 1, further comprising:

a retaining member that is held by the terminal accommodating section at a mounting completion position with respect to the terminal accommodating section and holds the terminal fitting in the terminal accommodating chamber at the accommodation completion position, wherein the terminal accommodating chamber is formed in an indoor space in which the terminal fitting is relatively movable in an alignment direction orthogonal to the terminal insertion direction and the direction in which the end surfaces of the respective two end portions face each other, the retaining member blocks movement of the terminal fitting with respect to the terminal accommodating section in the terminal removal direction at the mounting completion position, and includes a terminal locking section that is arranged to face a locked section of the terminal fitting in the terminal removal direction at the mounting completion position and blocks movement of the locked section in the terminal removal direction, the terminal fitting includes a retainer accommodating section that accommodates the terminal locking section of the retaining member at the mounting completion position and is configured to relatively move with respect to the terminal locking section in the alignment direction, and a size of the projection in the alignment direction is larger than a maximum relative movement amount of the terminal fitting in the terminal accommodating chamber in the alignment direction.

4. The connector according to claim 2, further comprising:

a retaining member that is held by the terminal accommodating section at a mounting completion position with respect to the terminal accommodating section and holds the terminal fitting in the terminal accommodating chamber at the accommodation completion position, wherein the terminal accommodating chamber is formed in an indoor space in which the terminal fitting is relatively movable in an alignment direction orthogonal to the terminal insertion direction and the direction in which the end surfaces of the respective two end portions face each other, the retaining member blocks movement of the terminal fitting with respect to the terminal accommodating section in the terminal removal direction at the mounting completion position, and includes a terminal locking section that is arranged to face a locked section of the terminal fitting in the terminal removal direction at the mounting completion position and blocks movement of the locked section in the terminal removal direction, the terminal fitting includes a retainer accommodating section that accommodates the terminal locking section of the retaining member at the mounting completion position and is configured to relatively move with respect to the terminal locking section in the alignment direction, and a size of the projection in the alignment direction is larger than a maximum relative movement amount of the terminal fitting in the terminal accommodating chamber in the alignment direction.

* * * * *